US006823519B1

(12) United States Patent
Baird et al.

(10) Patent No.: US 6,823,519 B1
(45) Date of Patent: Nov. 23, 2004

(54) CONTROL OBJECT AND USER INTERFACE FOR CONTROLLING NETWORKED DEVICES

(75) Inventors: Andrew C. Baird, Kirkland, WA (US); Griffith Kadnier, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/339,649

(22) Filed: Jun. 24, 1999

(51) Int. Cl.[7] .............................................. G06F 9/46
(52) U.S. Cl. ....................... 719/313; 719/321; 709/223
(58) Field of Search ................................ 719/313, 321; 709/223, 243, 220, 310

(56) References Cited

U.S. PATENT DOCUMENTS

| | | | | |
|---|---|---|---|---|
| 5,574,860 A | * | 11/1996 | Perlman et al. | 709/220 |
| 5,959,536 A | * | 9/1999 | Chambers et al. | 340/636 |
| 6,032,202 A | * | 2/2000 | Lea et al. | 710/8 |
| 6,052,750 A | * | 4/2000 | Lea | 710/72 |
| 6,199,136 B1 | * | 3/2001 | Shteyn | 710/8 |
| 6,314,447 B1 | * | 11/2001 | Lea et al. | 709/105 |
| 6,314,459 B1 | * | 11/2001 | Freeman | 709/220 |
| 6,389,466 B1 | * | 5/2002 | Zondag | 709/221 |
| 6,434,447 B1 | * | 8/2002 | Shteyn | 709/220 |
| 6,600,958 B1 | * | 7/2003 | Zondag | 700/3 |

OTHER PUBLICATIONS

Johannes Helander and Alessandro Forin, "MMLife: A Highly Compnenlized System Architecture," 1998.*
Judi Romijn, "Model Checking the HAVi Leader ELection Protocl," 1999, p. 1–30.*
Yoshihiko, Imai et al., "Vuisual Case: A Software Development System for Home Appliances," IEEE, 1993, pp. 11–18.
Imai, Y.; Sumiya, K.; Yasutake, K.; Tanaka, H.; Haruna, S., "Interaction Design System For Home Appliances Based On Function Interactor With Constraints Model," Transactions of the Information Processing Society of Japan, vol. 36, No. 8, pp. 1938–50. [*Abstract in English*].

Stauffer, H. Brooke, "Smart Enabling System For Home Automation, IEEE Transactions on Consumer Electronics," vol. 37, No. 2, May 1991, p. xxxvp.

Corcoran, P.N., Lusten, K., "A Remote Electronic Object Emulation System For Home Buisness Applications," IEE Transactions on Consumer Electronics, vol. 40, No. 3, pp. 405–10.

Corcoran, P.M.; Papal, F.; Zoldi, A., "User Interface Technologies For Home Appilances and Networks," IEEE Trans. Consum. Electron. (USA), vol. 44, No. 3, pp. 679–85.

* cited by examiner

*Primary Examiner*—Meng-Al T. An
*Assistant Examiner*—Li B. Zhen
(74) *Attorney, Agent, or Firm*—Woodcock Washburn LLP

(57) ABSTRACT

A system for including a set of software components and an application programming interface for the logical networked representation and implementation of a system of smart devices within a home or small office environment. The software components include a control object component and a user interface component. The control object is a software object capable that carries out communication, accepts and issues control messages. The control object allows a user to remotely control or query a physical device for which the specific control object has responsibility and for maintaining logical and physical connections and control of the device. The user interface supplies a coherent and transparent interface across all network media and topologies. The user interface is capable of communicating with any control object that it identifies as being controllable in a given system. The communication may be across a logical network or may be local to a particular device. The user interface takes on the "personality" of the physical device for which the attendant control object carries a logical and physical mapping and control responsibility.

29 Claims, 12 Drawing Sheets

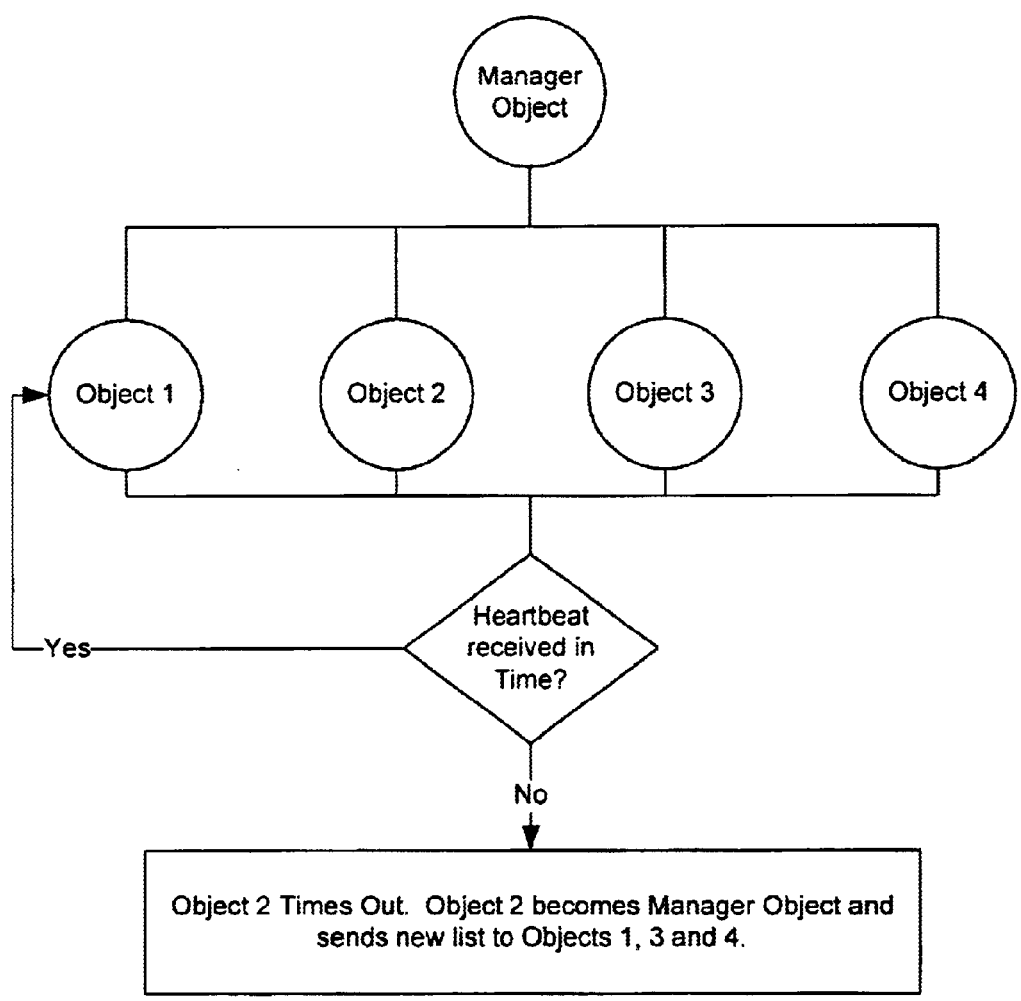

FIG. 9A

| HomeObject |
|---|
| +m_fIsDirty : BOOL = FALSE <br> +m_fIsReady : BOOL <br> +m_fList : BOOL <br> +m_endthread : BOOL <br> +m_eType : OBJTYPE <br> +m_iobjPos : int = 0 <br> +m_IBuffer : void* <br> +m_OBuffer : void* <br> +m_buffer[512] : char <br> +UDPRand : int <br> +m_UpdateMsg : UINT <br> +m_nPort : unsigned <br> +m_nORand : int <br> +m_hSocket : SOCKET = INVALID_SOCKET <br> +m_listen_socket_udp : SOCKET <br> +m_local_udp : struct <br> +m_EVh : HANDLE <br> +m_listen_socket_tcp : SOCKET <br> +m_msgsock_tcp : SOCKET <br> +m_local_tcp : struct <br> +m_EVh_udp : HANDLE <br> +m_EVh_tcp : HANDLE <br> +m_szAnnounce : LPSTR = NULL <br> +m_pMainWnd : HWND <br> +m_CtlPtr : void* <br> +m_DataLength : int <br> +m_pTCPData : LPSTR <br> +m_fOKtoSend : BOOL = TRUE <br> +m_DataPosition : int <br> +m_EVhWait : HANDLE <br> +m_EVh_tcpWait : HANDLE <br> +m_UDP : HANDLE <br> +m_TCP : HANDLE |
| +HomeObject() : <br> +~HomeObject() : <br> +InitHO() : BOOL <br>   +getKernelTransportEntry() : void * <br>   +setKernelTransportEntry(void* Kptr) : BOOL <br>   +GetMyControlListPosition() : BOOL <br>   +SendTCPBuffer(int Pos, void* Buffer) : BOOL <br> +GoAway() : BOOL <br>   +AllocBuffers(void* *IBuffer, void* *OBuffer, char* *TCPBuffer) : BOOL <br> +UDPMessage(int retval, LPSTR buffer) : void <br>   +WaitSec(int sec) : void <br>   +StuffString(char* buffer, int base, int num, OBJTYPE HOType, LPSTR szAnnounce, LPSTR strIP, ... <br>   +PickApart(char* buffer, int base, int* seqsize, int* indice, OBJTYPE* HOType, LPSTR szAnnounc... <br> +ChangeRand(int random) : int <br>   +WtoA(WCHAR* buff, char* target) : int <br> +SendUDPData(char* buffer) : void <br>   +GotUDPMessage(int len, LPSTR buffer) : void <br>   +GetHostAndPort(TCHAR* buff, int buffsize, unsigned int = *nP) : BOOL <br>   +ConnectTCP(LPCTSTR lpszHostAddress, UINT nHostPort) : BOOL <br> +Write(void* pData, int nLen) : int <br> +getObjType() : enum OBJTYPE <br> +AnnounceMyself() : void <br>   +DoCommand(CMDTYPE eCmd) : BOOL |

+m_pCO6List
        0..1

| CO6List | Abstract |
|---|---|
| #Num : int <br> #HOType : OBJTYPE* <br> #szAnnounce : LPSTR* <br> #strIP : LPSTR* <br> #nPort : int* <br> #nORand : int* <br> #Next : void* <br> #Prev : void* <br> #CO6Node : } <br> #Head : CO6Node* = NULL | |
| +CO6List(int num, OBJTYPE HOType, LPSTR szAnnounce, LPSTR strIP, int nPort, int nORand) : <br> +CO6List() : <br> +~CO6List() : <br> +InsertCO6Node(int num, OBJTYPE HOType, LPSTR pszAnnounce, LPSTR strIP, int nPort, int nORand) : int <br> +ChangeCO6Num(int, int) : int <br> +DeleteCO6Node(int, BOOL) : int <br> +GetFirstCO6Node() : int <br> +GetLastCO6Node() : int <br> +GetPrevCO6Node(int) : int <br> +GetNextCO6Node(int) : int <br>   +SetCO6Data(int num, OBJTYPE HOType, LPSTR szAnnounce, LPSTR strIP, int nPort, int nORand) : int <br>   +GetCO6Data(int num, OBJTYPE* HOType, LPSTR szAnnounce, LPSTR strIP, int* nPort, int* nORand) : int <br> +ReindexCO6Nodes() : int <br> #LookUpCO6Node(int) : CO6Node* <br> #LookUpPrevCO6Node(int) : CO6Node* <br> #KillNode(CO6Node*) : void <br>   #MakeNode(int num, OBJTYPE HOType, LPSTR szAnnounce, LPSTR strIP, int nPort, int nORand) : CO6Node* | |

FIG. 9B

| CO6List | Abstract |
|---|---|
| #Num : int<br>#HOType : OBJTYPE*<br>#szAnnounce : LPSTR*<br>#strIP : LPSTR*<br>#nPort : int*<br>#nORand : int*<br>#Next : void*<br>#Prev : void*<br>#CO6Node : }<br>#Head : CO6Node* = NULL | |
| +CO6List(int num, OBJTYPE HOType, LPSTR szAnnounce, LPSTR strIP, int nPort, int nORand) :<br>+CO6List() :<br>+~CO6List() :<br>   +InsertCO6Node(int num, OBJTYPE HOType, LPSTR pszAnnounce, LPSTR strIP, int nPort, int nOR...<br>+ChangeCO6Num(int, int) : int<br>+DeleteCO6Node(int, BOOL) : int<br>+GetFirstCO6Node() : int<br>+GetLastCO6Node() : int<br>+GetPrevCO6Node(int) : int<br>+GetNextCO6Node(int) : int<br>   +SetCO6Data(int num, OBJTYPE HOType, LPSTR szAnnounce, LPSTR strIP, int nPort, int nORand)...<br>   +GetCO6Data(int num, OBJTYPE* HOType, LPSTR szAnnounce, LPSTR strIP, int* nPort, int* nORa...<br>+ReindexCO6Nodes() : int<br>#LookUpCO6Node(int) : CO6Node*<br>#LookUpPrevCO6Node(int) : CO6Node*<br>#KillNode(CO6Node*) : void<br>   #MakeNode(int num, OBJTYPE HOType, LPSTR szAnnounce, LPSTR strIP, int nPort, int nORand) : ... | |

FIG. 10A
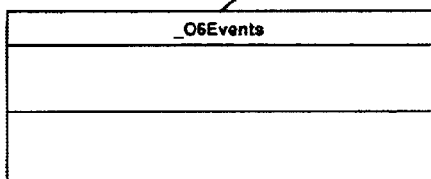
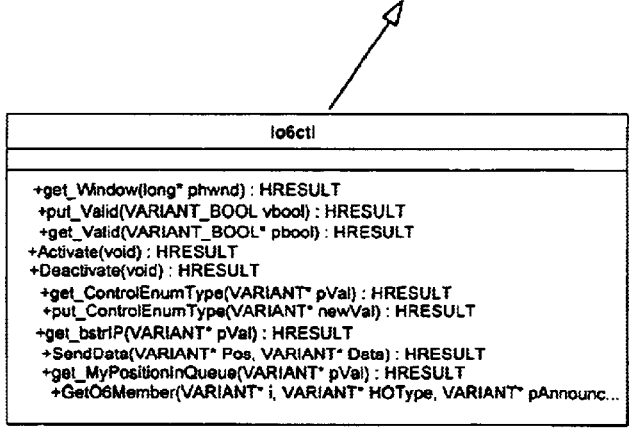

CONTROL OBJECT AND USER INTERFACE FOR CONTROLLING NETWORKED DEVICES

FIELD OF THE INVENTION

The present invention relates generally to facility management systems such as home automation systems, and, more particularly, to an object oriented design software control object within such systems that provides for a logical representation and implementation of a network of physical devices.

BACKGROUND OF THE INVENTION

In the past, environments having networked equipment were typically limited to commercial and industrial sites. Such equipment was typically complex and highly sophisticated computer controlled machines that utilized networks to coordinate manufacturing activities. However, unlike the commercial and industrial setting, the typical consumer setting included devices and appliances that were fairly unsophisticated and that were operated by a user on a one-to-one basis. To achieve the consumer device's specific function, the user had to physically interact with the device by, for example, pressing buttons on a coffee maker to preset the machine to turn ON at a specific time.

Early advances in consumer devices and appliances were limited to remote control devices that, at first, were wired to the device, and later used infrared (IR) communications to transmit commands. However, the remote control devices still forced the user to interact with their respective devices on a one-to-one basis. In addition, most hand-held remote control devices were proprietary, which required separate remote controllers for each consumer product. Further advancements included universal remote controllers that were capable of being programmed to control many consumer devices. However, universal remote control devices were limited in that they were typically not able to control devices other than entertainment equipment.

Lately, consumer appliances have become more sophisticated because of the decreased size and costs of computer-related components such as microprocessors. These new consumer devices include the so-called "smart" devices that, like the sophisticated commercial and industrial machinery, are capable of executing predefined tasks and capable of communicating over a network infrastructures. An example of a system is smart devices is CEBus®, which may utilize household powerlines to transport messages between compliant CEBus® household devices. CEBus® is implemented per EIA IS-60 for home automation. The CEBus® system utilizes controller and receptacle units to communicate and control CEBus® compliant devices. The receptacle units are connected to standard household receptacles and the command and control information is communicated over the powerlines. However, the CEBus® system is a hardware solution, which requires that the compliant devices be designed to be compatible with the standard. As a further limitation, the CEBus® controller is a special-purpose device. While this is an advancement over prior solutions, this hardware solution limits the upgradablity of the network and the devices, and fails to provide a solution for non-compliant smart devices.

A further example of a system that is intended to network devices is Jini™, which is based on Java™. Jini™ uses Java Remote Method Invocation protocols to move code around a network of devices. Network services run on top of the Jini™ software architecture such that devices and applications may register with the network via a lookup service. However, the Jini™ system is limited in that each device must register with the lookup service for other devices to discover them. Thus, each device is not aware of other devices on the network without first pointing to the lookup service. Further, there is no general purpose user interface that enables a user to interact and control all of the networked devices from a remote location.

In view of the above, there is a need for a system whereby once isolated and non-remotely controllable and configurable devices are able to share information with and about each other, and are able to provide and accept common command, control, and communication though a network. There is also a need for a system that provides the networked devices with the ability to operate autonomously in the case of a network failure, or for localized control and operation. There is also a need for a system that provides users with a method to control devices with a general purpose device (e.g., personal computer), and that provides a method to communicate over open network infrastructures. The present invention provides a solution to address the limitations and shortcomings of the prior art.

SUMMARY OF THE INVENTION

The present invention includes a set of software components and an application programming interface for the logical networked representation and implementation of a system of smart devices. The software components may be generally expressed as a control object component and a user interface component. The control object (CO) is a software object that may carry out communication, and accept and issue control messages. The control object allows a user to remotely control or query a physical device for which the specific control object has responsibility and also maintains logical and physical connections and control of the device.

The second component is the user interface, or consumer presentation display (CPD), which supplies a coherent and transparent interface across all network media and topologies. The user interface is capable of communicating with any control object that it identifies as being controllable in a given system. This communication may be across a logical network or may be local to a particular device. The user interface takes on the "personality" of the physical device for which the attendant control object carries a logical and physical mapping and control responsibility.

In accordance with an aspect of the invention, the control object may be adapted to bind to any designed physical transport mechanism for communication with other control objects and is adapted to be embedded in a container application and executed within a wrapper executable. In addition, the control object is preferably polymorphic, and thus is able to take on the logical attributes and command and control capabilities of any of the devices.

The control object may be a component object model object (COM) that exists within the operating system. This preferably provides wrappers for exposed clients and enables the use of method calls and exposed properties by the operating system or other application software programs. The control object may include extensions such that the control object may logically and physically pass a control signal to the devices and send a message to one of any electronic controllers or interfaces provided in the devices. In accordance with a feature of the invention, the first registered control object in the system may be designated a manager object, which performs list management to maintain and administer the list of control objects by periodically broadcasting the list to all registered control objects on the system. The list contains the logical attributes, an identifier and an address of all registered control objects on the system. The Identifiers are preferably globally unique random numbers generated at runtime, so as to identify each registered object "on-the-fly." This globally unique identifier may be also used with directed object-to-object communication, where a specific object must communicate with another specific object. Preferably, the random generator is a linear congruential generator; i.e., $f(z)=16807\ z\ \mathrm{mod}\ (2^{**}31-1)$.

In accordance with another feature of the present invention, the user interface is adapted to control the devices either locally or across the network. The user interface may also be adapted to control all of the devices that are functioning on the network via the control object. In addition, the user interface preferably supplies a coherent and transparent interface across all network media and topologies. Further, if the devices include a display by which the device may be controlled, in accordance with an aspect of the invention, the display may be adapted to control other devices via the network and the control objects.

In accordance with an aspect of the present invention, a method of registering the control objects is provided, which includes broadcasting a control message from an enabled control object to inform other registered control objects that the enabled control object exists; determining if the enabled control object is a first registered control object; and appointing the first registered object as a manager object to administer the list.

The manager object may send the list to any new control object that registers with the system; periodically broadcast the list to all registered control objects; and perform a synchronization to force all other control objects to synchronize to the list. An election process is held if the manager object ceases to function. The election process may comprise promoting a second registered control object to the manager object; promoting all other control objects up one position on the list; and distributing the list to all registered control objects on the system. If any other control object ceases to function, the list is preferably distributed to all registered control objects if any control object other than the manager object ceases to function.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIG. 8 illustrates an election process whereby a new manager object is appointed when a periodic message is not received from the manager object; and FIGS. 9A, 9B, 10A, 10B, 11 and 12 are exemplary Booch diagrams that express the static structure of the object classes, their internal structure, and the relationships in which they participate in a preferred embodiment of the system described above with regard to FIGS. 2–7.

DETAILED DESCRIPTION OF THE INVENTION

The present invention provides for a software system that may be implemented on any network infrastructure such that networked devices may be remotely controlled by, e.g., a general purpose computer, and a system whereby the networked devices may share information with and about each other. The present invention provides and accepts common command, control and communication through the network while retaining the ability of each device to operate autonomously.

Computer Environment

Figure 1:
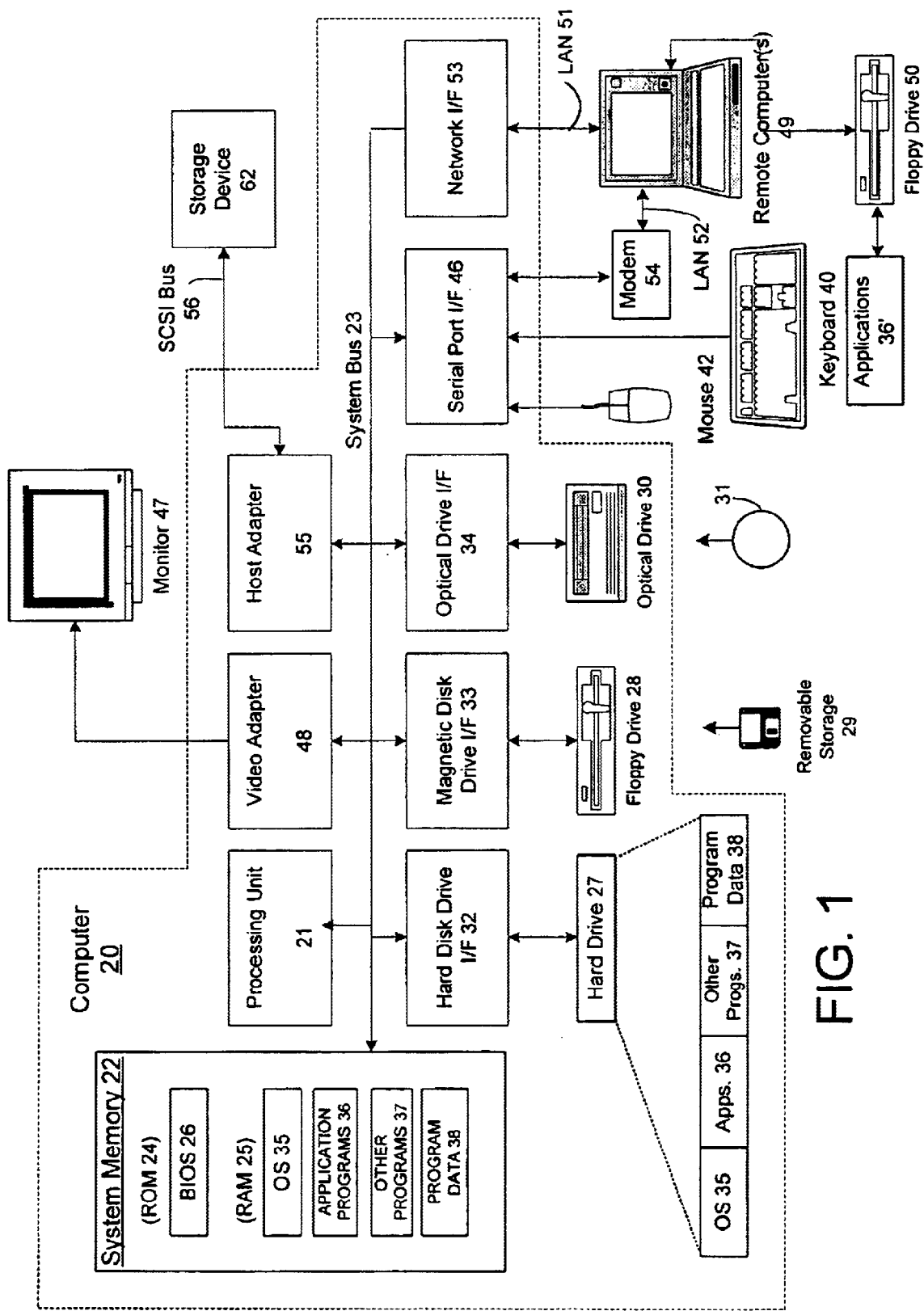
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. A more detailed description of the invention will be presented with reference to the home area network of FIG. 2 and the description of the control object in FIGS. 3–12.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Home Area Network Environment Employing a Control Object and User Interface

Figure 2:
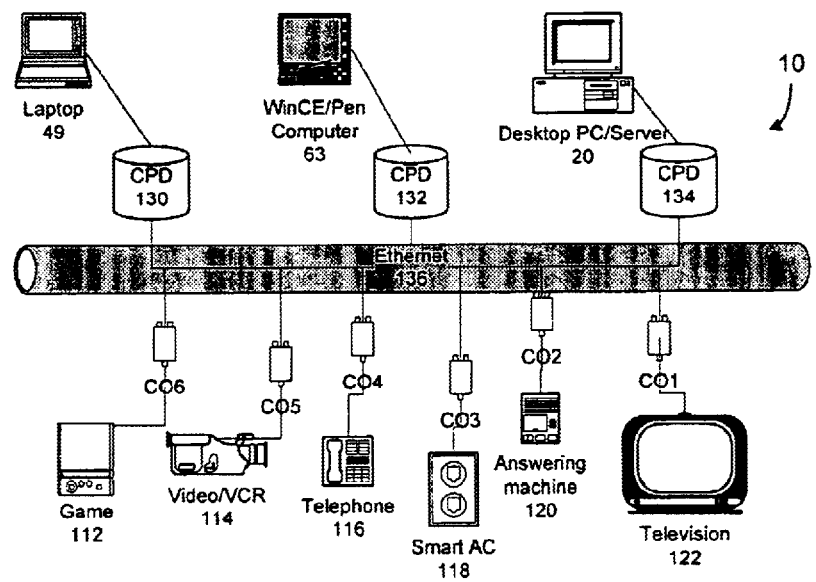
FIG. 2 is an exemplary environment in which aspects of the present invention may be incorporated.

As noted, the computer 20 described above can be deployed as part of a computer network within which the system of the present invention may be implemented. In general, the above description applies to both server computers and client computers deployed in a network environment. As will become evident, the above description may also apply, in part, to appliances and devices attached to the network that have the ability to accept and execute software instructions. FIG. 2 illustrates one such exemplary network environment in which the present invention may be employed.

The present invention may be implemented in, for example, a household, a small office, or other similar environment. As illustrated, several devices are attached to the network 10 that may be controlled by users within the home or office. Such devices include, for example, a game device 112, a video device (VCR) 114, a telephone 116, a smart AC outlet 118, an answering machine 120, and a television 122, which may be connected to the network 10 as client devices. Other consumer devices, small office machines, and security devices may be connected to the network 10.

Also connected to the network are general purpose computing devices that may control the above-identified devices 112–122. Such devices include a notebook (laptop) computer 49, a hand-held computing device 63, and a desktop PC/server 20. The notebook computer 49 preferably operates utilizing Windows® 95/98 or Windows NT® 4.0 Workstation (or higher) operating systems. The hand-help computing device 63 preferably operates running Windows® CE 2.0 (or higher) operating system. The PC/Server 20 preferably runs the Windows NT® 4.0 Workstation or Server (or higher) operating system.

As illustrated, the devices 20, 49, 63 and 112–122 are connected to a network medium 136. The physical transport of the medium 136 is preferably Ethernet, since this topology is in ubiquitous use. However, the present invention is not limited to any particular physical network technology and may include fiber optic, X.10, and serial. This system 10 preferably utilizes TCP and Internet protocol (IP) as a common network layer, although it is not limited to the TCP/IP transport protocol, and the devices 20, 49, 63 and 112–122 are preferably identified by IP addresses.

In accordance with the present invention, each of the above consumer devices 112–122 is represented by a control object CO1–CO6. As will be described in greater detail below, the control objects CO1–CO6 are software objects designed to logically take on the physical attributes of devices 112–122 attached to the network 10.

Although not shown in FIG. 2, the devices 112–122 preferably include a microprocessor/microcontroller and a read-only memory containing an embedded operating system (e.g., Windows® CE 2.0 (or higher)). The embedded operating system and/or an application running on the operating system serves to control the functions of the devices 112–122. The methods provided by the control objects CO (discussed below) may be executed by the operating system or the software application. It is preferable that the operating system of the devices include application programming interfaces (APIs) to enable each device's attendant control object CO to control the device based on the information contained within the control object CO. Such a structure would allows device manufacturers to use the control object CO, application software, and/or the device operating system to implement functions that would be appropriate for the manufacturer's specific device or service (e.g., providing play and record functions within the VCR 114).

The present invention also provides for a user interface to allow users to interact and control the devices 112–122. The general purpose computing devices 20, 49 and 63 may act as the user interface or "consumer presentation displays" (CPD) 130, 132 and 134 to provide a coherent and transparent interface to users across all network media 136 and topologies. The user interface will be described in greater detail below.

Control Object Architecture and User Interface

Control Object

The control object and its operation within the network 10 will now be described in greater detail with reference to FIGS. 3–11. The control object CO logically represents the attributes of its associated physical device in order to provide for local and/or remote control of the device. The control object CO additionally maintains a list of other control objects CO registered on a given system such that any one control object may logically control any physical device connected to the system network. An exemplary implementation of the control object CO will now be described.

The control object CO supports a layered software model that allows multiple transport layers to bind to the core object at runtime. The control object CO is preferably polymorphic, meaning that it can take on the logical attributes and command and control capabilities of any particular real-world device. The control object CO also is adapted to bind to any designed physical transport mechanism for communication with other control objects or control programs. The control object is further preferably capable of being embedded in a container application and/or executed within a wrapper executable. When the control objects CO1–CO6 are active, each carries out communication, accepts and issues control messages, contains data specific to the devices on the network, and allows a user to remotely control or query the physical device for which the specific control object CO has responsibility for maintaining logical connections and control.

Figure 3:
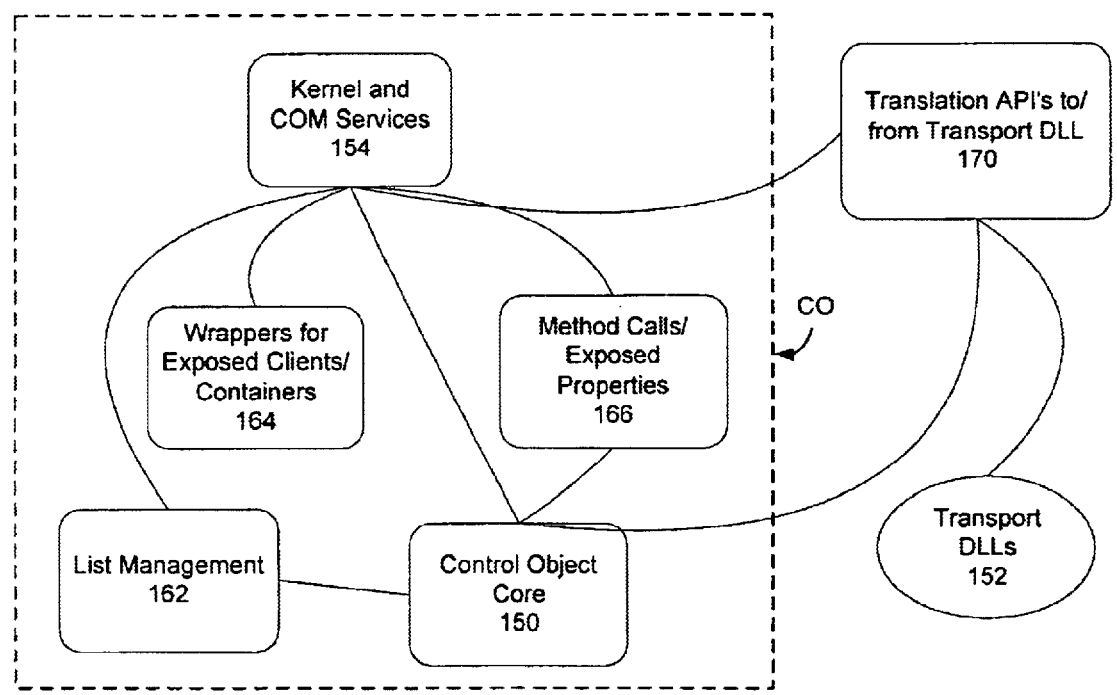
FIG. 3 is a block diagram illustrating the internal architecture of a control object of the present invention.
Figure 4:
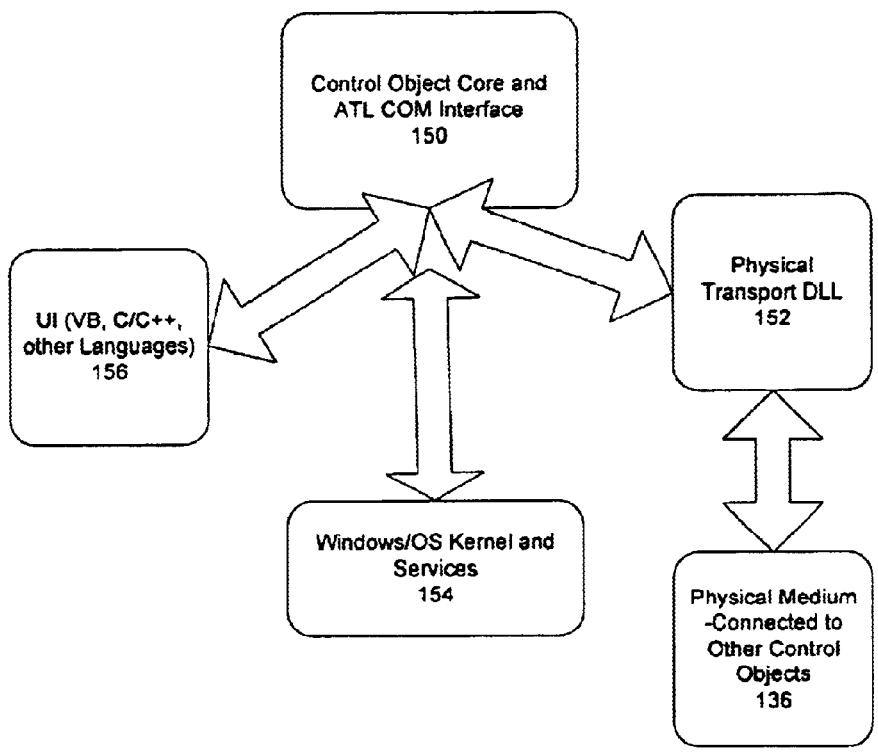
FIG. 4 is a block diagram illustrating the interaction of the control object with external software components, an operating system and physical transport media.
Figure 5:
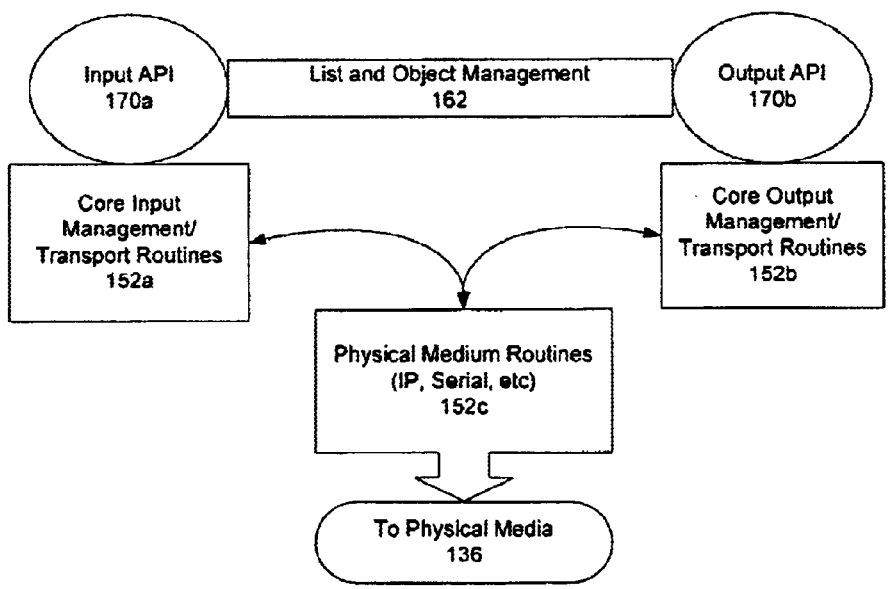
FIG. 5 is block diagram illustrating the relationship of list and object management, application programming interfaces, transport dynamically linked libraries, physical media routines, and the physical media.

FIGS. 3 and 4 illustrate the inner architecture of the control object CO and the connectivity of the control object to a user interface 156, an operating system kernel 154, physical transport dynamically linked libraries (DLLS) 152, and the physical medium 36. As a summary, the control object CO is preferably embodied as a Component Object Model (COM) object that exists within the operating system (e.g., Windows® 95/98, Windows NT®, Windows® CE) that calls transport DLLs 152 through well known medium neutral application programming interfaces (APIs) 170 to communicate via the network medium 36. The data and events to be communicated by the control object CO, are embodied as callbacks and function (method) returns. Typically, the control object CO will load, activate, deactivate, and pass data to and from the transport.

Turning to the exemplary embodiment, the control object CO includes a core 150 that has a COM interface to access the operating system kernel and COM services 154. The operating system kernel schedules activities (threads) for the computer processor to perform, and it handles interrupts and exceptions. If the computer has multiple processors, the kernel synchronizes activity among the processors to optimize performance. COM provides a binary standard for component interoperability by allowing any programming language that can call functions via pointers (e.g., C, C++, Small Talk®, Ada, and Basic) to interoperate with other components written to the same binary standard. The control object CO preferably utilizes COM services 154 and the associated interfaces, because the interfaces have predefined behaviors and responsibilities that allow applications to interact with each other and the operating system, are programming language-independent, and are provided on multiple platforms (e.g., Microsoft® Windows®, Microsoft® Windows NT®, Apple® Macintosh®, UNIX®).

APIs 170 are called to translate to and from the transport DLLs 152 that provide for physical transport of information over the network medium 36. The APIs are a set of routines that request and carry out lower-level services performed by the operating system. In the case of Microsoft® Windows® operating systems, the APIs may also manage the application's windows, icons, menus, and dialog boxes.

The transport DLLs 152 are reusable functions that can be called from other executable code. Under the Win32® model used in Microsoft® Windows® 95/98 and Windows NT®, the operating system maps the DLLs into the address space of a process when the process is starting up or while it is running. The process then executes the functions of the DLL.

The control object core 150 also communicates to the user interface 156, which operates as the aforementioned consumer presentation display (CPD). The user interface 156 communicates with registered control objects COs for each of the physical devices 112–122 connected to the media 36. A more detailed description of the CPD is provided below.

The control object CO provides wrappers (container) 163 for exposed clients and enables use of method calls and exposed properties 166 that may be used by e.g., an operating system or other application software program. The wrapper 163 is provided to envelope (i.e., wrap) a call to a function or program inside another function or program. Methods and exposed properties 166 are logical operations provided by an object. In object-oriented programming, an object invokes a method by sending a message that contains the receiving object and the name of the specific method to invoke. Objects use messages as the mechanism through which they interact. Preferably, the methods are data neutral, in that they all take arguments of type VARIANT. Such typing allows the methods to be interoperable with Visual Basic, Delphi, and other ActiveX objects, as well as with C/C++, and applications such as Microsoft Internet Explorer (via HTML based scripting). An exemplary list of methods and exposed properties 166 available to the client container 164 are outlined in Table 1A below.

TABLE 1A

Methods Exposed to the Client Container

STDMETHOD(GetAvailableData)(VARIANT *iPos, VARIANT *iLen, VARIANT *Data);
  This method allows a client to receive data after a "data available" event has been fired.
STDMETHOD(GetO6LastNode)(VARIANT *i);
  This method retrieves the position of the last CO in the global list (for enumeration).

TABLE 1A-continued

Methods Exposed to the Client Container

STDMETHOD(O6Load)(short *i, BSTR bAnnounce, BSTR IP,
short *Port);
   This method loads the object (and its transport DLL) and initializes
   input parameters.
STDMETHOD(GetO6Member)(VARIANT *i, VARIANT *HOType,
VARIANT * pAnnounce, VARIANT * bIP, VARIANT *iPort,
VARIANT *iRand);
   This method allows a client to receive list information on any
   registered CO present on the network.
STDMETHOD(get_MyPositionInQueue)(/*[out, retval]*/
VARIANT *pVal);
   This method (property) allows the client to discover its position
   on the global list.
STDMETHOD(get_bstrIP)(/*[out, retval]*/ VARIANT *pVal);
   This method (property) allows a client to receive its CO's IP or GUID.
STDMETHOD(get_ControlEnumType)(/*[out, retval]*/
VARIANT *pVal);
   This method (property) allows a client to discover it's own
   enumerated type.
STDMETHOD(put_ControlEnumType)(/*[in]*/ short newVal);
   This method (property) allows a client to set its enumerated type.
STDMETHOD(Deactivate)();
   This method allows a client to deactivate (deregister) the associated CO.
STDMETHOD(Activate)();
   This method allows a client to activate (register) the associated CO.
STDMETHOD(SendData)(short *Pos, BSTR *Data);
   This method allows a client to send arbitrary data to another
   CO (client).

In general, when a COM object notifies its clients that something has happened, the COM object sends out a message. The message is called an event and the process of sending the message is referred to as "event firing." In accordance with the present invention, Table 1B outlines an exemplary list of methods (i.e., logical operations) that cause event firings on behalf of the client container 164.

TABLE 1B

Methods that Cause Event Firings

STDMETHOD(Event_Activate)();
      The control object CO is activated.
   STDMETHOD(Event_Loaded)();
      The control object CO is loaded and initialized
   STDMETHOD (Event_DeActivate)();
      The control object CO is deactivated and deregistered.
   STDMETHOD (Event_DataAvail)();
      There is incoming data available.

The interaction between the control object CO and the transport DLLs 152 is illustrated in greater detail with reference to FIG. 4 and Tables 2A and 2B below. As shown in FIG. 4, Input and Output APIs 170a and 170b call transport DLLs that provide for core input and output management and the transport routines 152a and 152b. The APIs 170 and transport DLLs 152 are preferably provided by the operating system for the purpose of transporting data. The transport routines 152a and 152b, together with physical media routines 152c, provide access to the physical media 36 by providing the necessary transport protocol of the media (e.g., IP, serial, etc.). As noted above, the data and events that need to be communicated by the control object CO are embodied as callbacks and function (method) returns and the control object CO will typically need to load, activate, deactivate, and pass data to and from the transport.

TABLE 2A

Calls into the Transport DLL

TYPEDEFS:
typedef VOID * (WINAPIV* LPFNDLLFUNC1)(VOID *, VOID *);
typedef VOID * (WINAPIV* LPFNDLLFUNC2)(VOID *,int *,
int *,LPSTR,LPSTR,int *, int *);
typedef INT (WINAPVI* LPFNDLLFUNC3)(VOID *);
typedef VOID (WINAPIV* LPFNDLLFUNC4)(VOID *,int);
typedef VOID (WINAPIV* LPFNDLLFUNC5)(VOID *,LPSTR);
typedef VOID * (WINAPIV* LPFNDLLFUNC6)(VOID *,int *,int
*,LPSTR);
typedef VOID * (WINAPIV* LPFNDLLFUNC7)(VOID *, VOID *,
int i, LPSTR
bAnnounce, LPSTR IP, int Port);
typedef VOID * (WINAPIV* LPFNDLLFUNC8)(VOID *, int * i,
int *j, LPSTR Data);

TABLE 2B

Transport Call Definitions extern "C"_declspec(dllexport) void * CPPLoad(void * uPtr,
void * uPtrA, int i, LPSTR pAnnounce, LPSTR pIP, int Port)
   Loads the Physically neutral part of the transport DLL routines,
   including linked list and object instantiation. Fires a "loaded"
   event when done.
extern "C"_declspec(dllexport) void * CPPActivate(void * uPtr,
void * uPtrA)
   Activates the physical transport. Fires an "activated" event when done.
extern "C"_declspec(dllexport) void * CPPDeactivate (void * uPtr,
void * uPtrA)
   Unloads the physical transport, deregisters the object, and returns
   the object to a neutral state.
extern "C"_declspec(dllexport) void * CPPSendData (void *uPtr, int *i,
int *iLen, LPSTR bPtrA)
   Sends actual data to the transport DLL for relay to another CO
   on the network.
extern "C"_declspec(dllexport) void * GetO6Member (void *uPtr, int *i,
int *j, LPSTR bPtrA, LPSTR
   Receives CO network member data based upon the member's position
   in the global list.
extern "C"_declspec(dllexport) int GetControlEnumType (void *uPtr)
   Returns the enumerated CO type (i.e. VCR, LIGHT, STEREO, etc.)
extern "C"_declspec(dllexport) void PutControlEnumType (void *uPtr,
int i)
   Registers the enumerated CO type (i.e. VCR, LIGHT, STEREO, etc.)
extern "C"_declspec(dllexport) void GetIP (void *uPtr, LPSTR bPtrA)
   Returns the IP address of the local object. If not IP based, this API
   returns a GUID that is generated for the instantiation of the local object.
extern "C"_declspec(dllexport) int GetPosition (void *uPtr)
   Returns the local object's position in the global list.
extern "C"_declspec(dllexport) int GetO6LastNode (void *uPtr)
   Returns the maxima of the global list.
extern "C"_declspec(dllexport) void GetData (void *uPtr, int *iPos,
int * iL, LPSTR uData)
   Returns data that has been received from another CO, and a
   data-available event has been fired for.
extern "C" void_cdecl SendDataToClient(int i, int j, void * buff)
   Callback for certain instances (architecturally) of the CO. It takes the
   place of a manual GET on the inbound data received from another CO.

In addition to the control object's inter-communication capabilities provided by the APIs 170 and transport DLLs 152, the control objects CO in a system are capable of upper and lower edge control functions. Upper edge control functions include interaction with the user interface 156, and lower edge control functions include interaction with the network media 36 and the devices 112–122. The control functions are related to the control object's logical representation of its associated physical device. In addition, by using extensions, a particular control object CO may logically and physically pass a control signal to a physical device directly, or send a message to the physical device's electronic controller or interface.

Referring again to FIG. 3, the control object CO also performs list management 162. List management is a feature of the invention whereby each control object CO maintains a list of its own state and the states of all other registered control objects existing in a live state on the network 10. An exemplary implementation of list management 162 is outline with respect to FIGS. 6 and 7.

Figure 6:
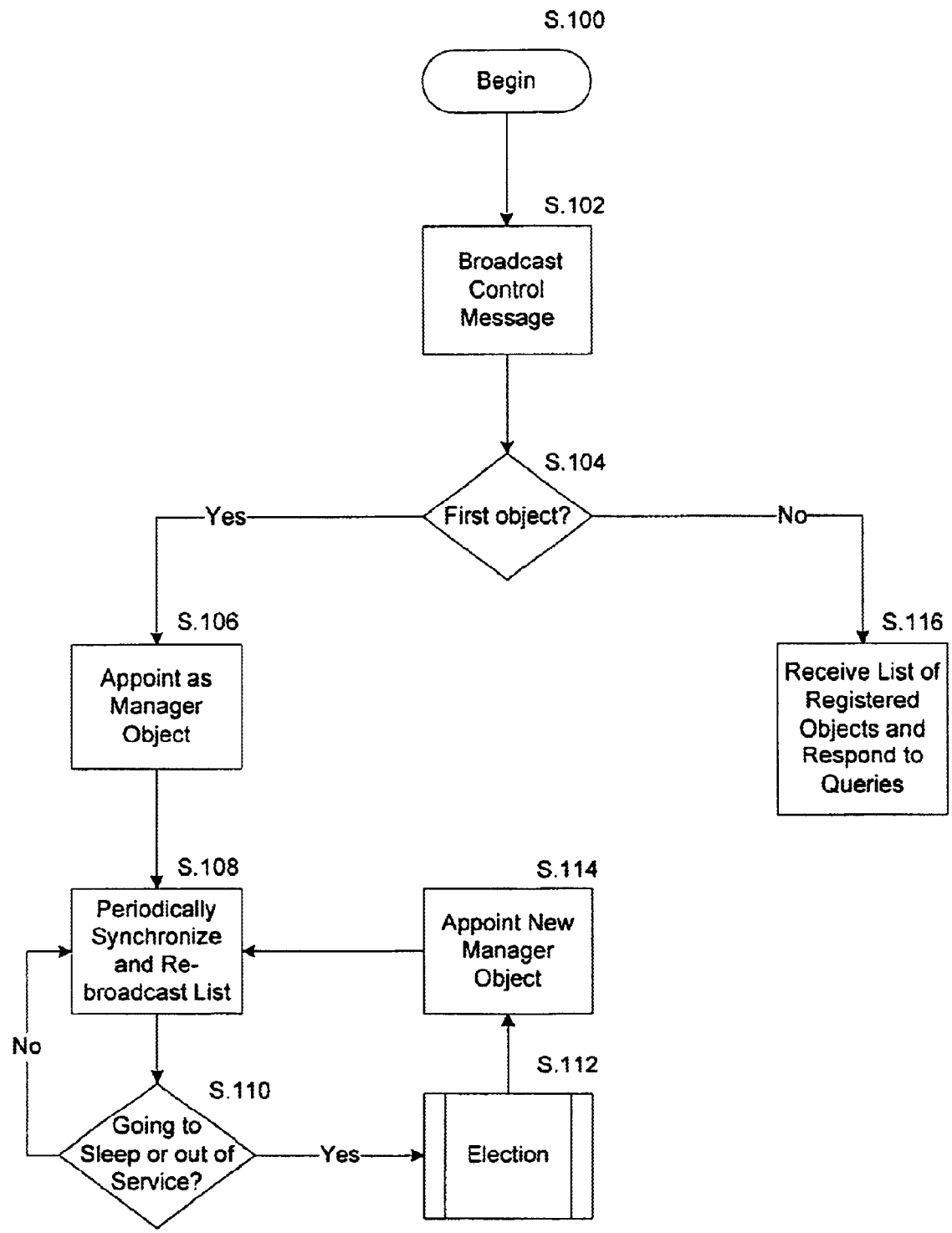
FIG. 6 is a flowchart illustrating the process by which the control object registers with the system and how a manager object is appointed.

Referring to FIG. 6, when a physical device 112–122 is first turned ON and functioning, its associated control object CO1–CO6 is enabled (S.100). The control object broadcasts a control message to inform other registered control objects that it exists (S.102). This will allow all other control objects within a given system to remain (or become) aware of each other's existence and world-state. If the control object CO is the first control object (S.104) to register with the system 10 (i.e., no other control objects are listed), the control object CO becomes a "manager object" (S.106). In addition to the control object's primary control duties with regard to the physical device it represents, the first control object CO (i.e., the manager object) maintains and administers a list of all other control objects. The list preferably contains an identifier (D) and an IP address for each registered control object on the networked system 10. This feature makes the list of control objects self-administering. The identifiers are preferably globally unique random numbers generated at runtime, so as to identify each registered object "on-the-fly." This globally unique identifier may be also used with directed object-to-object communication, where a specific object must communicate with another specific object. Preferably, the random generator is a linear congruential generator; i.e., $f(z)=16807 \, z \bmod (2^{**}31-1)$.

The manager object responsibilities, however, are deliberately limited to allow each control object CO as much autonomy as it requires or is capable of having in view of the device it is controlling. The manager object sends a copy of the world-state list to any new control object CO that registers with the system 10. Also, the manager object periodically broadcasts the list to registered control objects COs and performs a synchronization (i.e., takes a census) to force all other control objects to synchronize to the updated list (S.108).

The manager object position is an elected position and all control objects COs have the ability to become the manager object should the manager object be disconnected or otherwise unable to perform its duties (S.110). The election of a manager object preferably is performed as illustrated in FIG. 7 (S.112).

Figure 7:
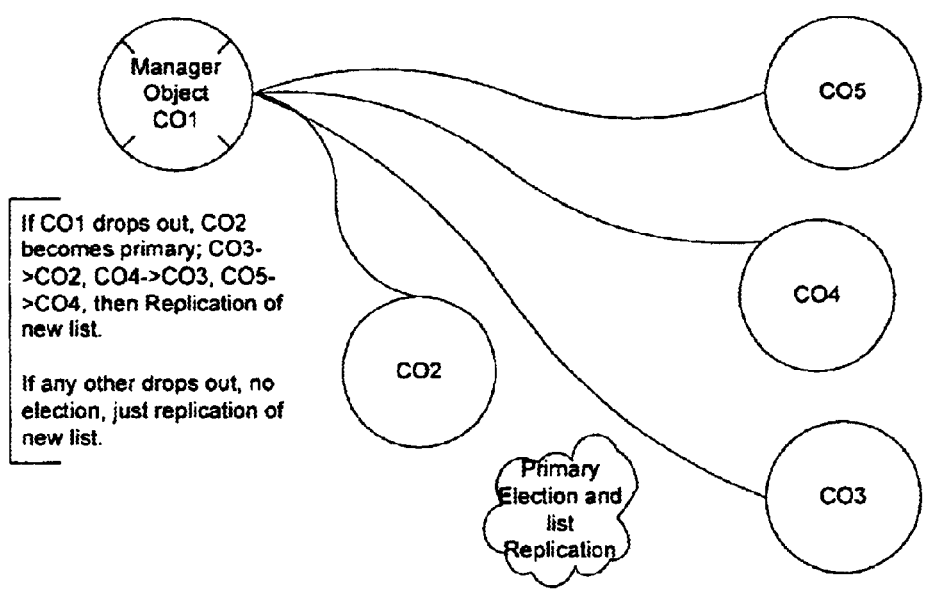
FIG. 7 illustrates an election process whereby a new manager object is appointed when an existing manager is removed from the system.
Figure 10B:
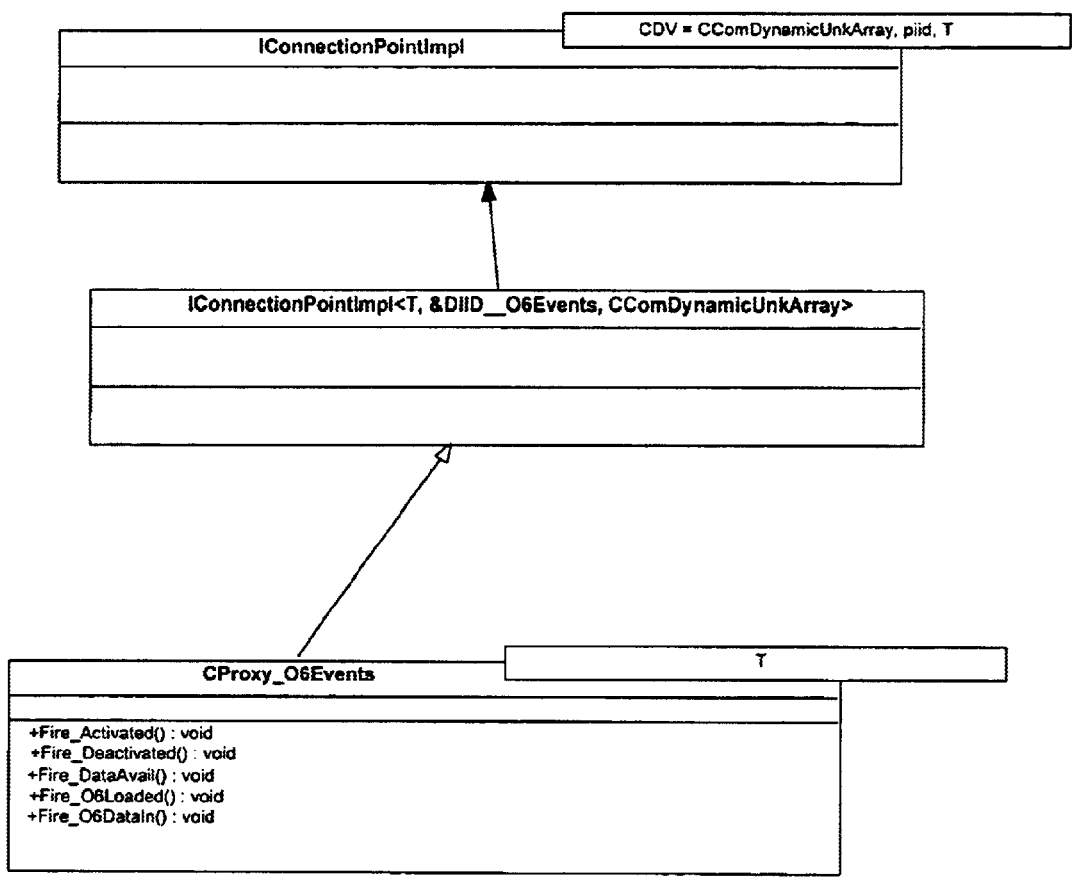
Figure 11:
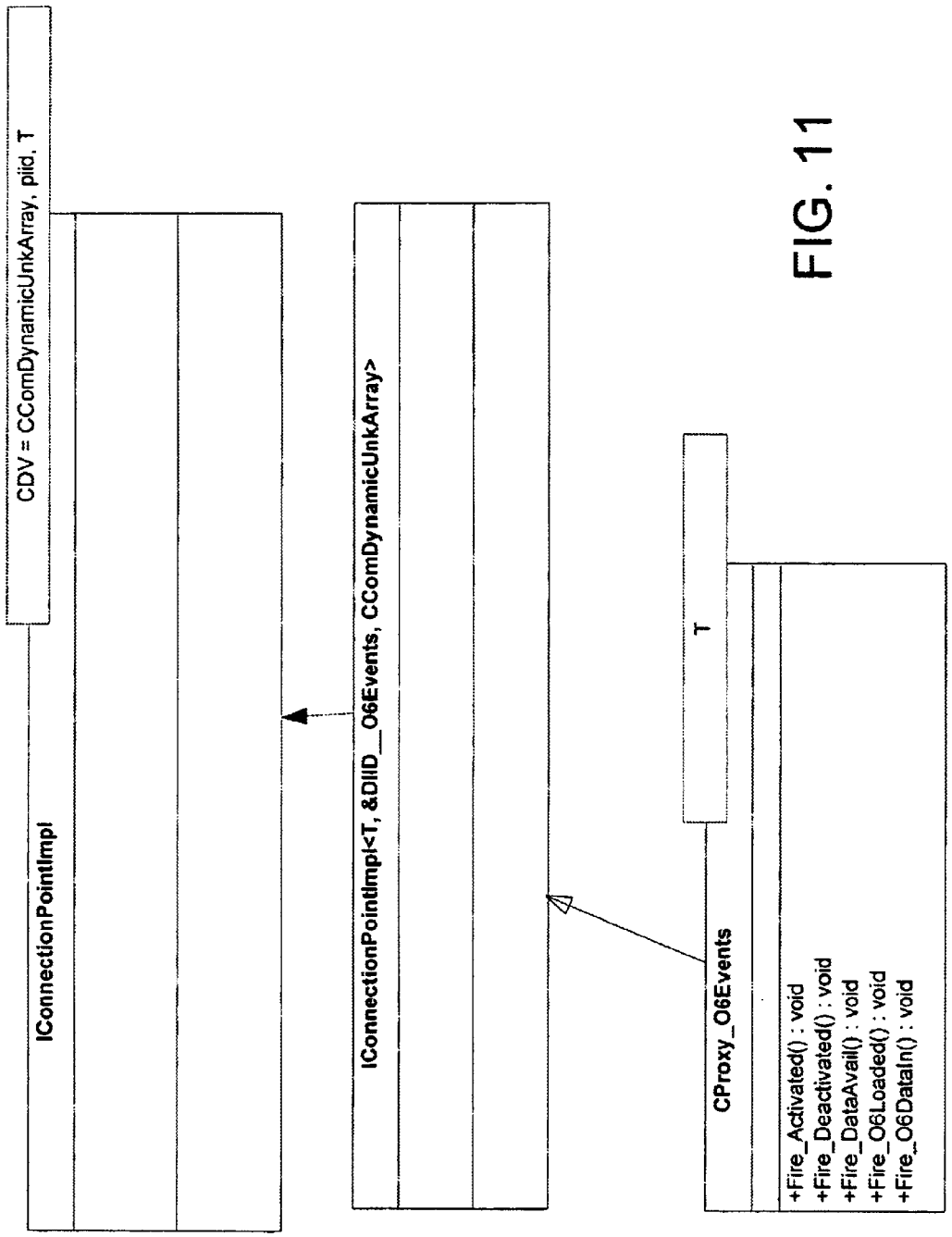
Figure 12:
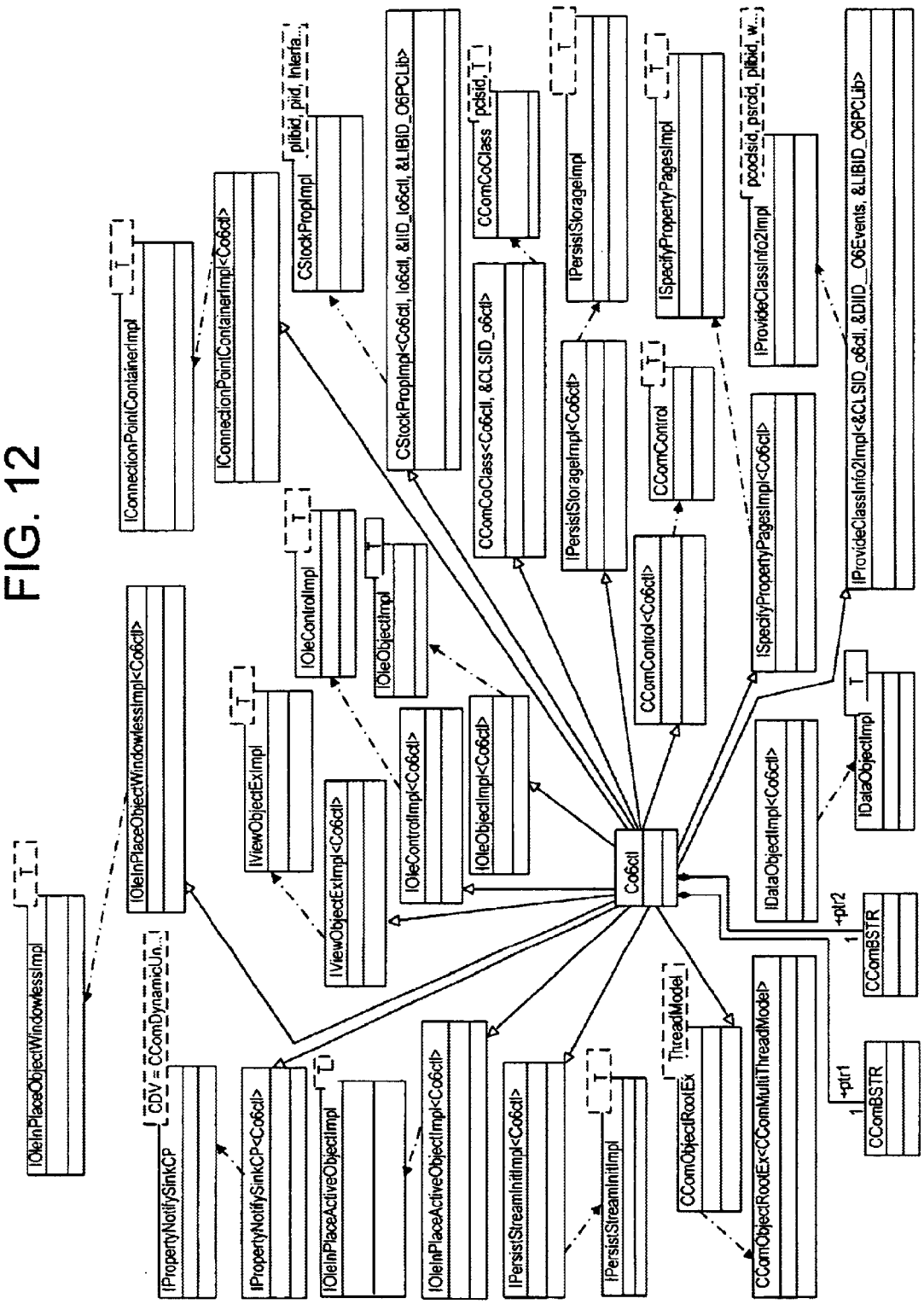

Referring now to FIG. 7, when the manager object (e.g., CO1) drops out of the system 10, the second registered control object (CO2) becomes the manager object. All other control objects move up one position on the list (i.e., CO3 becomes CO2; CO4 becomes CO3; and CO5 becomes CO4, etc.) and a new list is created. The newly created list is then replicated to all control objects on the system 10. However, if, for example control object CO2 drops out of the system and control object CO1 remains, no election is held, but a new list is replicated and passed to all registered control objects. As further indicated in FIG. 8, when a "heartbeat" (i.e., a periodic message from the manager object indicating that the manager object is alive) is not provided from the manager object within the specified arbitrary time limit, the first device to timeout waiting for the manager heartbeat message will automatically elect itself manager and immediately send an updated list to all other objects. In the example of FIG. 8, if the timeout period expires for Object 2 prior to a heartbeat being received from the manager object. Accordingly, Object 2 elects itself as manager object and informs the other objects by sending a new list to all of the registered objects. This can mean, in cases where the manager is not actually inoperative, but rather just very busy, that manager object-related duties can pass to another registered object by way of default, rather than manager object failure.

Referring back to FIG. 6, after a new manager object is elected (S.112) and appointed as a manager object (S.114), the new manager object performs the duties discussed above with regard to S.108. It is noted that there are preferably cross checks to ensure that if an manager object is rudely pulled out of service without a normal shut down message (e.g., its respective device ceases functioning without notice at S.110), that the system 10 will perform the recovery election of FIG. 7. This will ensure the immediate determination and election of a manager object and that newly promoted manager object will take a new census of the remaining objects such that each control object will have an up-to-date list of other control objects.

Referring back to S.104, when the control object CO registering with the system 10 is not the first object, it receives a list of registered objects from the manager object and will respond to queries from the manager object or other objects (S.116) while in an active state. Each control object CO preferably provides information only if queried by another object. All subordinate objects receive a "heartbeat" message from the manager object. If the heartbeat is not sent to the subordinate object in a pre-determined amount of time, the subordinate objects will automatically hold an election and one of these subordinates will become the manager (in the case where the manager object ceases to exist in a non-failsafe way).

It is preferable that all control objects CO are peers in the system 10, and any physically dependent component that is less than a peer has a controller, which assumes the peer role. Further, when a physical device 112–122 is to be turned OFF and to cease functioning, it is preferable that the associated control object CO1–CO6 broadcast a message to inform other objects that it no longer exists and should be removed from the world-state list.

Each control object preferably will be able to query any other CO to retrieve the other CO's state, dependencies, and possible actions. If no response is received, the CO will be considered to have gone to sleep, which will cause the manager CO to rebuild and present a new list to the remaining COs.

User Interface

The user interface 156 (consumer presentation display 130, 132 and 134) enables a user to control all devices 112–122 attached to the network via registered and controllable control objects. The consumer presentation display 130, 132 and 134 (CPD) supplies a coherent and transparent interface across all network media and topologies. This communication and control may be across a logical network or may be local to a particular physical device. The CPD takes on the personality of a physical device, for which the attendant control object CO carries out logical and physical mapping and control responsibility. In the case of, e.g., the VCR 114, the CPD 130 contacts the VCR control object CO5, queries the control object CO5 for capabilities and state information, and then presents a user with an appropriate display. The appropriate display in this example may include tape operation buttons and programming menus, which would be displayed by the CPD 130 on the laptop 49. That CPD would be capable of showing status for, and issuing commands to, the VCR 114 (through the registered control object CO5).

The CPDs 130, 132 and 134 are primarily expressed in this invention as a component of the upper-edge control mechanism. It is preferable that the operating system running on the laptop 49, pen computer (hand-held computer) 63, or desktop PC 20 contain a set of APIs to retrieve information from the control object CO and to generate the display of the CPD 130, 132 and 134. In addition, the CPD preferably uses HTML formatting techniques and may be programmed in Visual BASIC, C/C++, or other programming language. Information from a particular control object CO may be retrieved by calling the appropriate API, and based on the information retrieved, the CPD formats an appropriate screen for the user to control the device.

Although the general purpose computing devices are shown as CPDs 130, 132, 134, it is noted that any device having display capabilities may act as a CPD. In particular, because the CPD retrieves information from the control objects CO1–CO6, and the control objects CO1–CO6 all perform list management 162 and are aware of their world-state and the world-state of all other objects, a display provided with, e.g., the game device 112 may be used to operate the video device 114. This feature is provided by the APIs included in the game device operating system or the software application controlling the game device 112, which enables the game device's attendant control object CO6 to control the video device 114 based on the world-state list information contained in the control object CO6. The control object CO6 would communicate command and control information to the control object CO5 to accomplish physical control of the video device 114. Further, the display on the game device 112 would be formatted to the personality of the VCR control display (i.e., display tape operation controls, etc.) in accordance with the world-state information.

FIGS. 9A, 9B, 10A, 10B, 11 and 12 are exemplary Booch (class) diagrams that express the static structure of the object classes, their internal structure, and the relationships in which they participate in a preferred embodiment of the system described above with regard to FIGS. 2–7 in order to further provide one of skill in the art with a description of the present invention. It is noted that references in FIGS. 9A, 9B, 10A, 10B, 11 and 12 to a "home object" are references to the "control object" above.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to =the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, while the devices shown to be clients and controllable by the CO have been illustrated as a game device, a video device, a telephone, a smart AC outlet, an answering machine, and a television, other devices may be controlled include, but not limited to personal computers, security systems, dishwashers, etc. In addition, other operating systems than the Microsoft® Windows® family may be provided with the appropriate APIs to implement the features of the invention.

What is claimed:

1. In a network comprising a plurality of software controllable devices that communicate over said network, said software controllable devices including an embedded operating system, a distributed system for controlling said software controllable devices, comprising:

at least one control object, said control object comprising a component object model object residing in said embedded operating system and accessible to a respective software controllable device and including logical attributes of said respective software controllable device, said control object accepting and issuing control messages to and from said respective software controllable device, and said control object being polymorphic such that said control object is adapted to take on the logical attributes and command and control capabilities of any of said software controllable devices; and a user interface adapted to receive said control object, retrieve said logical attributes, and accept and issue control messages to and from said control object, said user interface residing in at least one of said software controllable devices, wherein said control object is appointed to be a manager object if said control object is a first registered control object in said distributed system, and wherein said control object registers with said system when active and maintains a list of all other registered control objects in said distributed system, and wherein if a manager object drops out of said distributed system, a subsequently registered objects is appointed to be said manager object, and wherein all of the control objects are capable of being said manager object.

2. The system of claim 1, wherein said control object is adapted to bind to any designed physical transport mechanism for communication with other control objects.

3. The system of claim 1, wherein said control object is adapted to be embedded in a container application and executed within a wrapper executable.

4. The system of claim 1, wherein said operating system includes application programming interfaces to retrieve data from, and write data to, said control object.

5. The system of claim 4, wherein said control object provides wrappers for exposed clients and enables use of method calls and exposed properties by said operating system or other application software program.

6. The system of claim 4, wherein said control object utilizes transport DLLs provided by said operating system for transporting data between said devices.

7. The system of claim 1, wherein said control object further comprises extensions, wherein said control object is adapted to logically and physically pass a control signal to said software controllable devices, and wherein said control object is adapted to send a message to one of an electronic controller and interface provided in said software controllable devices.

8. The system of claim 1, wherein said list contains said logical attributes, an identifier and an address of all registered control objects on said system.

9. The system of claim 1, wherein said user interface is adapted to control said devices locally and to control said devices across said network.

10. The system of claim 9, wherein said user interface is adapted to control all of said devices functioning on said network via said control object.

11. The system of claim 9, wherein said user interface supplies a coherent and transparent interface across all network media and topologies, and wherein said user interface takes on the personality of said respective one of said physical devices for which said control object carries out logical and physical mapping and control responsibility.

12. The system of claim 1, wherein said respective one of said software controllable devices further comprises a display by which said respective one of said software controllable devices is controlled, and wherein said display is adapted to control others of said devices via said network and said control object.

13. A method of registering control objects, the method comprising:

broadcasting a control message from an enabled control object to inform other registered control objects that said enabled control object exists;

determining if said enabled control object is a first registered control object;

appointing said first registered object to be a manager object to administer a list of logical attributes of software controllable devices; and wherein all control objects are capable of being a manager object in a system for controlling a plurality of software controllable devices having embedded operating systems and represented by a plurality of control objects that maintain said list of logical attributes of respective ones of said software controllable devices, said control object accepting and issuing control messages to and from said respective ones of said software controllable devices, and said control object being a component object model object and polymophic such that said control object is adapted to take on the logical attributes and command and control capabilities of any of said software controllable devices.

14. The method as recited in claim 13, said manager object further:

sending said list to any new control object that registers with said system;

periodically broadcasting said list to all registered control objects; and performing a synchronization to force all other control objects to synchronize to the said list.

15. The method as recited in claim 13, wherein said list contains an identifier and an address for each registered control object on said system.

16. The method as recited in claim 13, further comprising performing an election if said manager object ceases to function, said election comprising:

promoting a second registered control object to said manager object;

promoting all other control objects up one position on said list; and distributing said list to all registered control objects on said system.

17. The method as recited in claim 16, further comprising distributing said list to all registered control objects if any control object other than said manager object ceases to function.

18. In a network comprising a plurality of software controllable devices that communicate over said network, said software controllable devices containing an embedded operating system and a computer-readable storage medium within which information is stored, a system for controlling said software controllable devices, comprising:

a plurality of control objects residing in said embedded operating system of respective ones of said software controllable devices, said control objects comprising component object model objects and including logical attributes of said respective ones of said software controllable devices, said control objects further accepting and issuing control messages to and from said respective ones of said software controllable devices, and said control objects being polymorphic such that said control objects are adapted to take on the logical attributes and command and control capabilities of any of said software controllable devices, wherein said control objects register with said system and are assigned an random unique identifier and are active while said respective ones of said software controllable devices are functioning, and wherein said control objects maintain a list of all other registered control objects and their logical attributes and wherein a first registered control object of said plurality of control objects is designated to be a manager object, said manager object performing list management to maintain and administer said list by periodically broadcasting said list to all registered control objects on said system, and wherein said list contains said logical attributes, said random unique identifier and an address of all registered control objects on said system, and wherein any control object in said system can function as said manager object.

19. The system of claim 18, wherein said control objects are adapted to bind to any designed physical transport mechanism for communication with other control objects.

20. The system of claim 19, said control objects further comprising extensions wherein said control objects are adapted to logically and physically pass a control signal to said devices, and wherein said control objects are adapted so send a message to one of an electronic controller and interface provided in said devices.

21. The system of claim 18, wherein said software controllable devices comprise an operating system, said operating system including application programming interfaces to retrieve data from and write data to said control object.

22. The system of claim 18, further comprising a user interface adapted to receive said control objects, retrieve said logical attributes, and accept and issue control messages to and from said control object, wherein said user interface is adapted to control said devices across said network and locally with respect to said respective one of said devices.

23. The system of claim 22, wherein said user interface supplies a coherent and transparent interface across all network media and topologies, and wherein said user interface takes on the personality of said respective one of said physical devices for which said control objects carry out logical and physical mapping and control responsibility.

24. The system of claim 18, wherein at least one of said physical devices further comprises a display by which said at least one of said physical devices is controlled, and wherein said display is adapted to control others of said devices via said network and said control objects.

25. In a network comprising at least one software controllable device that communicates over said network and is remotely controllable over said network, said software controllable device containing an embedded operating system and a computer-readable storage medium within which state information is stored, a system for controlling said software controllable device, comprising:

a control object residing in said embedded operating system and comprising a component object model object, said control object including said state information of said software controllable device, said control object further accepting and issuing control messages to and from said software controllable device, and said control object being polymorphic such that said control object is adapted to take on the logical attributes and command and control capabilities of any software controllable device attached to said network, wherein said control object registers with said system and is active while said software controllable device is functioning, and wherein said control object maintains a list of any other control object registered with said system and corresponding logical attributes, and wherein said control object is designated to be a manager object if it is a first registered object in said network, said manager object performing list management to maintain and administer said list by periodically broadcasting said list to all registered control objects on said network, and wherein said list contains said logical attributes, a random unique identifier and an address of all said registered control objects on said system, and wherein any control object in said system can function as said manager object.

26. The system of claim 25, wherein said control object is adapted to bind to any designed physical transport mechanism for communication with other control objects.

27. The system of claim 26, said control object further comprising extensions wherein said control object is adapted to logically and physically pass a control signal to said device, and wherein said control object is adapted to send a message to one of an electronic controller and interface provided in said device.

28. The system of claim 25, further comprising a user interface adapted to receive said control object, retrieve said logical attributes, and accept and issue control messages to and from said control object, wherein said user interface is adapted to control said devices across said network and locally with respect to said device.

29. The system of claim 28, wherein said user interface supplies a coherent and transparent interface across all network media and topologies, and wherein said user interface takes on the personality of said physical device for which said control object carries out logical and physical mapping and control responsibility.

* * * * *

UNITED STATES PATENT AND TRADEMARK OFFICE
CERTIFICATE OF CORRECTION

PATENT NO. : 6,823,519 B1  Page 1 of 1
APPLICATION NO. : 09/339649
DATED : November 23, 2004
INVENTOR(S) : Andrew C. Baird It is certified that error appears in the above-identified patent and that said Letters Patent is hereby corrected as shown below:

| COLUMN | LINE | ERROR |
|---|---|---|
| 10 Table 2A | 8 (Apprx) | Delete "WINAPVI" and insert -- WINAPIV --. |
| 11 | 22 | Delete "(D)" and insert -- (ID) --, therefore. |
| 16 | 55 | In Claim 24, delete "physical" and insert -- software controllable --, therefore. |
| 16 | 56 | In Claim 24, delete "physical" and insert -- software controllable --, therefore. |

Signed and Sealed this

Twenty-ninth Day of May, 2007

JON W. DUDAS
*Director of the United States Patent and Trademark Office*